4 Sheets—Sheet 1.

A. BROOKS.
Sewing and Embroidering Machine.

No. 235,609. Patented Dec. 14, 1880.

Witnesses:
S. N. Piper,
H. W. Lunt.

Inventor:
Abraham Brooks.
by attorney,
R. H. Eady

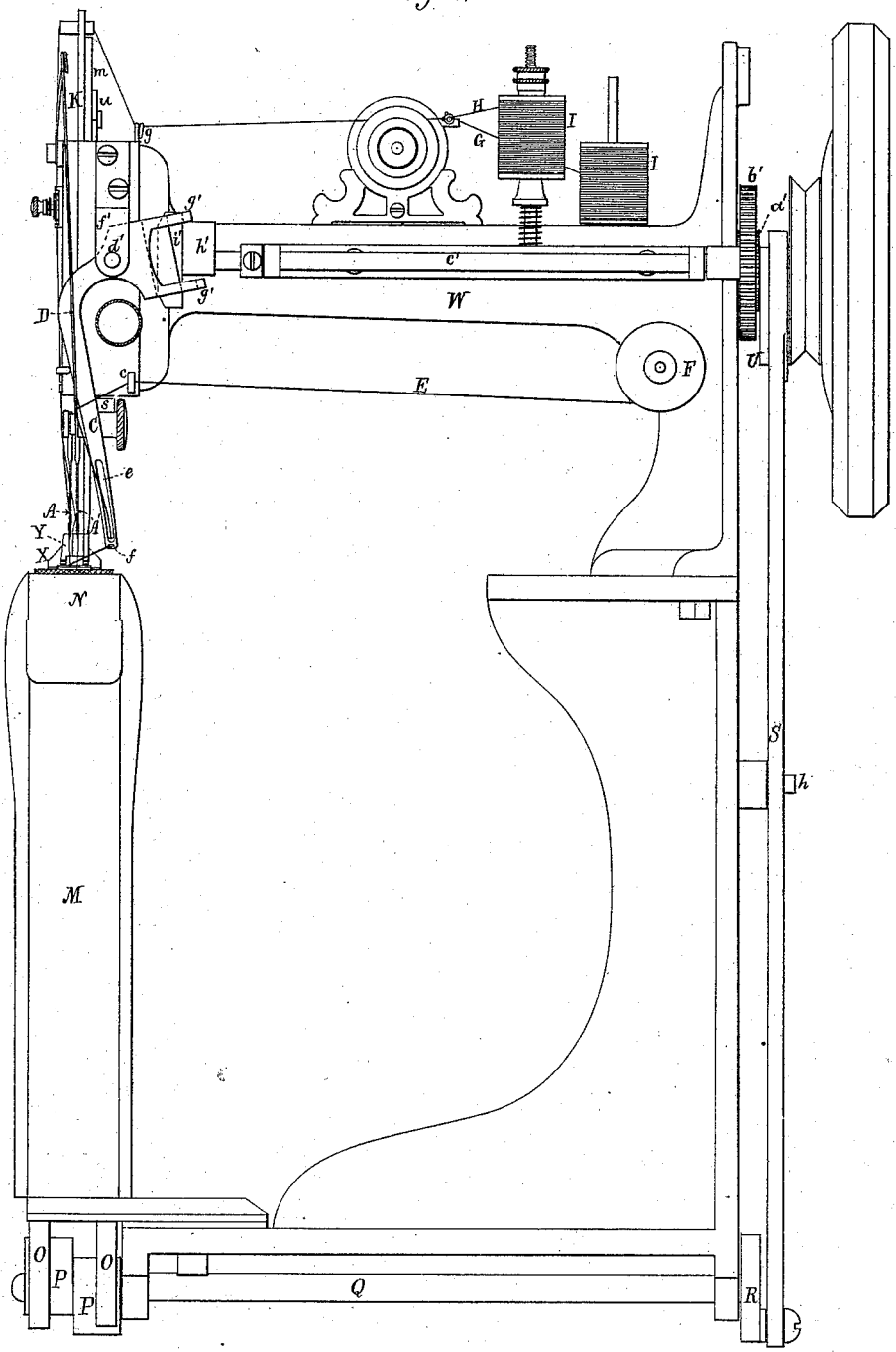

A. BROOKS.
Sewing and Embroidering Machine.
No. 235,609. Patented Dec. 14, 1880.
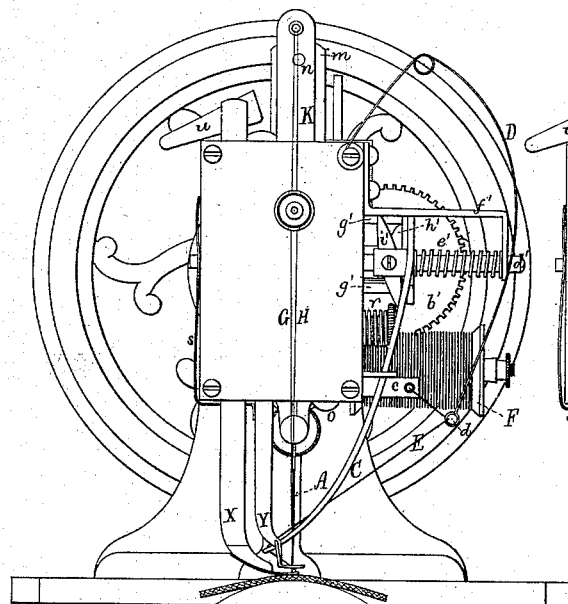
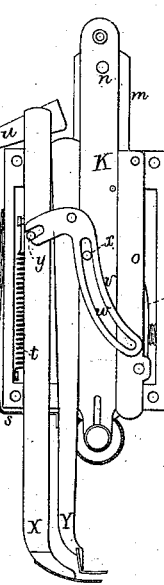
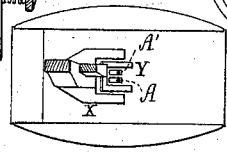
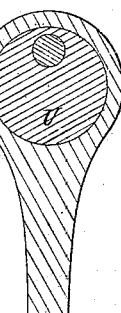
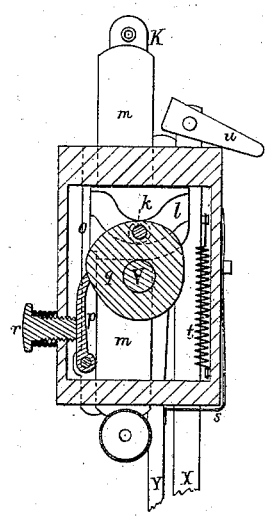
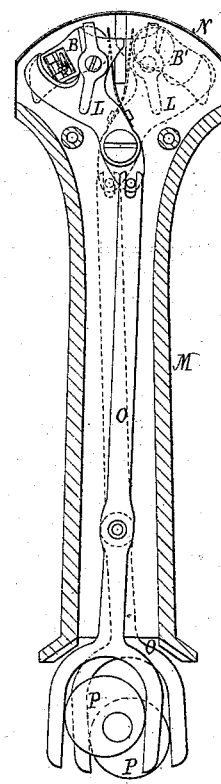
Witnesses.
Inventor:
Abraham Brooks,
by attorney,

A. BROOKS.
Sewing and Embroidering Machine.

No. 235,609. Patented Dec. 14, 1880.

Witnesses:
S. N. Piper
H. W. Lunt

Inventor:
Abraham Brooks
by attorney,
R. H. Eddy

UNITED STATES PATENT OFFICE.

ABRAHAM BROOKS, OF ACUSHNET, ASSIGNOR TO HIMSELF, WILLIAM C. STODDARD, AND LYMAN H. STODDARD, OF FAIRHAVEN, MASS.

SEWING AND EMBROIDERING MACHINE.

SPECIFICATION forming part of Letters Patent No. 235,609, dated December 14, 1880.

Application filed February 9, 1880.

*To all whom it may concern:*

Be it known that I, ABRAHAM BROOKS, of Acushnet, in the county of Bristol and State of Massachusetts, have invented a new and useful Improvement in Machines for Sewing and Embroidering; and I do hereby declare the same to be described in the following specification, and represented in the accompanying drawings, of which—

Figure 1:
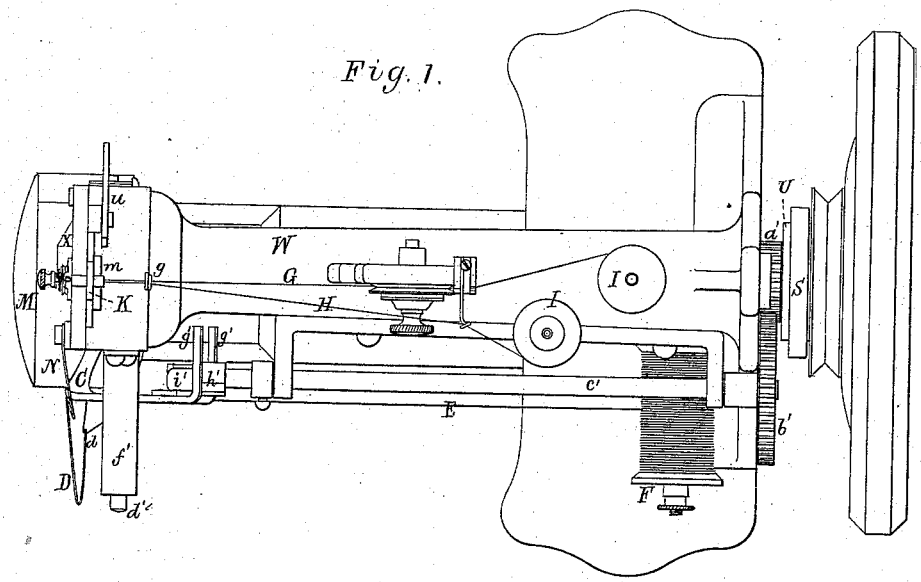
Figure 4:
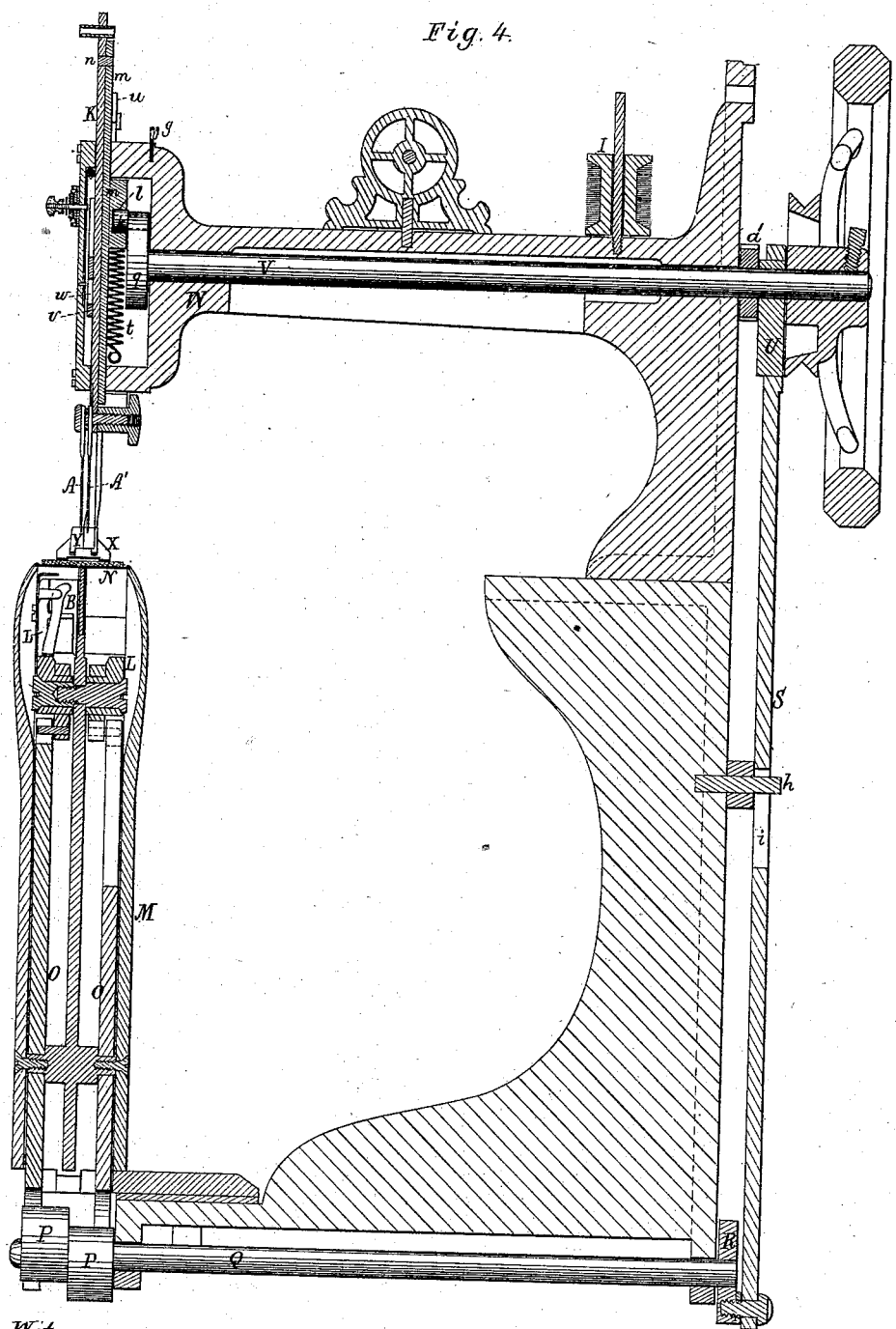

Figure 1 is a top view, Fig. 2 a side elevation, Fig. 3 a front-end elevation, and Fig. 4 a longitudinal section, of a machine embodying my invention. Fig. 5 is a top view of the shuttle-carrying arm, the two needles, and the pressers, to be hereinafter described. Fig. 6 is a vertical section of said arm, taken so as to show the shuttle-carriers. Figs. 7 to 13, inclusive, show the product of the machine, and also certain details of construction of the same, to be hereinafter specifically referred to.

The object of my invention is to provide a machine applicable to the working of embroidery upon hosiery, or hollow, cylindrical, or curved goods, and specially designed for the working of clocking upon hose.

The invention consists in the combination, in a sewing-machine with two needles and two shuttles and their operating mechanism, of a long hollow vertical standard for holding the work, and also for holding the shuttles and their operating mechanism, and a vibrating figuring-thread carrier, traversing once to every two throws of the needles and operating to carry the embroidering-thread back and forth in a zigzag manner behind both the needles, so as to lay it across the fabric in a straight stitch, bound at the edges by the needle-threads, and giving the desired effect of clocking, the arrangement of the shuttles permitting a very narrow double seam, all as hereinafter more particularly set forth.

Figure 7:
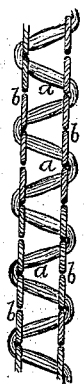
Figure 8:

Fig. 7 is a representation of one kind of embroidery performed by said machine, Fig. 8 being an illustration of another kind made by it. In each of the said figures the figuring-thread, or that which is laid in a zigzag or serpentine course, is shown at $a$. In Fig. 7 the two lines of binding-threads or sewing are represented at $b\ b$; but in Fig. 8 there is but one line of binding-thread or sewing, it being shown at $b$, in which case, for the performance of such embroidery, one needle and its shuttle only are put in operation or made to sew with the mechanism by which the figuring-thread is laid on the cloth.

Figure 9:
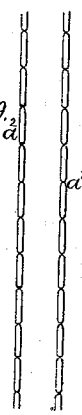

By leaving out the figuring-thread from its carrier the machine may be used to simultaneously perform two parallel lines of stitching or sewing, as shown at $a^2\ a^2$ in Fig. 9.

I would observe that, in order to clearly represent the kind of work performed by the machine, Figs. 7, 8, and 9, are drawn to an enlarged scale.

In the drawings, A A' represent the two needles, and B B' the two shuttles, C being the embroidery-thread carrier and D the tightener of said thread. This thread (shown at E) proceeds from a spool, F, through the eye of a stationary guide, $c$, and thence through that (shown at $d$) of the tightener, and thence through a long slot, $e$, in the thread-carrier, and thence down through an eye, $f$, near the end of said carrier, from whence the embroidery-thread passes to the cloth.

The thread-tightener is simply a wire spring extending from the head of the goose-neck, and formed as shown, its purpose being to so tighten the figuring-thread as to prevent it from becoming kinked or knotted.

The two binding-threads of the needles are represented at G H as proceeding from two spools, I I, to and through a suitable guide, $g$; thence through a guide at the upper part of the needle-bar K; thence downward to the two needles, which are eye-pointed to receive the two threads, there being one thread to each needle.

The needle-bar carrying the two needles is provided with suitable mechanism for imparting to it reciprocating rectilinear motions to cause the needles to work through and out of the cloth, and properly with respect to the shuttles B B', whose carriers L L are arranged within and supported by a hollow vertical standard or arm, M, whose upper surface or bed-plate, N, upon which the work or material to be sewed is to be supported, is shaped lengthwise to the arc of a circle concentric with the path of movement of each of the shuttles. Each shuttle-driver is a sectoral lever, fulcrumed within the vertical arm and jointed to its shorter or lower arm to one of two longer furcated levers O O, arranged within said arm and fulcrumed thereto. The prongs of each of said levers O span one of two eccentrics, P P, placed upon a horizontal shaft, Q, which at its rear end carries a crank-wheel, R. A lever, S, connected with the wrist of the crank-wheel extends upward to and yokes around an eccentric, U, fixed upon the driving-shaft V, arranged within the goose-neck W of the sewing-machine. Fig. 10 is a longitudinal section taken through the said lever and its operative eccentric, and showing the crank-wheel and the fulcrum of such lever, the fulcrum being a stationary stud, $h$, extended into a slot, $i$, made in the lever.

On the main shaft of the machine being put in revolution, reciprocating movements will be imparted to each shuttle-driver, these drivers moving at the same time in opposite directions.

In this machine the cloth is fed along by needles when in it, the needle-carrier having mechanism for effecting such movements of the needles. With the needles there are employed two furcated pressers, X Y, arranged as shown. The outer presser has only vertical movements imparted to it, its purpose being to hold the cloth down during the backward movement of the needles, and the inner presser the necessary length of the stitch and preparatory to the advance of the needles, to feed the work along. The inner presser holds the cloth down while the needles are being drawn out of it.

The needle-bar is reciprocated vertically by a crank, $k$, carried by the driving-shaft and working in a curved groove, $l$, formed in a cross-piece secured to the bar $m$, as shown in Fig. 11, which gives a rear view of the said bar, the needle-bar, near its upper end, being pivoted to the bar $m$, the pivot being represented at $n$.

The machinery which I prefer to employ for moving the needle-bar laterally to effect the feeding of the cloth or material to be sewed is substantially that known as the "Davis feed," and may be described as follows: Arranged against the front edge of the needle-bar is a swing-bar, $o$, pivoted near its upper end to the goose-neck. To the lower part of said bar (a rear view of which is given in Fig. 11) a short lever, $p$, is pivoted at its lower end. The upper end of said lever rests against the periphery of an eccentric, $q$, fixed upon the driving-shaft, such eccentric and lever being shown in the last-named figure, which also exhibits the fulcrum-screw $r$ of the said lever. This screw screws into the goose-neck and against the lever $p$, and regulates the length of stitch to be made. During revolution of the eccentric the necessary forward motion of the needles will be produced to feed the cloth along the required distance for the formatiom of a stitch, the needle-carrier being subsequently and at the proper time moved the opposite way by means of a spring, $s$, arranged on the goose-neck.

Fig. 12 is a front view of the two pressers and their operative mechanism. The outer presser or advance one has secured to its shank a spring, $t$, for drawing it downward, and besides there is pivoted to the upper part of the shank a lever, $u$, for raising it to and sustaining it in its highest position, such lever working against the top of the goose-neck. There is fulcrumed to the shank of the inner presser a bent lever, $v$, furcated in its smaller arm and provided with a curved slot, $w$, to receive a stud, $x$, extending from the needle-carrier. A stud, $y$, projecting from the shank of the forward or larger presser, extends into the fork of the slotted lever $v$. During vertical movements of the needle-carrier the slotted bent lever will be moved so as to effect the upward movements of the two pressers—that is to say, during the downward movement of the needle-bar the larger presser will be moved upward, while during the upward movement of the needle-bar and at the proper time the smaller presser will be moved upward, in order that it may advance with the needles while feeding the cloth. The pressers will be depressed at the proper time or times by the force of the spring applied to the larger.

The mechanism described in the foregoing two paragraphs for operating the presser-bar is substantially the same as that used in the ordinary Davis sewing-machine.

The next part of the machinery to be described is that for operating the figuring-thread carrier, which is as follows: On the driving-shaft is fixed a spur-pinion, $a'$, to engage with a spur-gear, $b'$, fixed upon a shaft, $c'$, arranged alongside of the goose-neck, and supported in suitable bearings applied thereto. The figuring-thread carrier is a furcated lever which turns on a stationary fulcrum or pin, $d'$, provided with a spring, $e'$, which bears against the thread-carrier and a bracket, $f'$, in manner as shown. Each prong, $g'$, of the fork of the figuring-thread carrier is bent near its middle at a right angle, as shown, and between the part so bent and fixed upon the shaft $c'$ is a cam, $h'$. (Shown in side view in Fig. 13, which represents such cam and another or duplex cam, $i'$, which is arranged on the shaft and in advance of the first-named cam.) The cam $h'$, on being revolved by its shaft, acts against the prongs of the figuring-thread carrier alternately, so as to impart to the said carrier its vibratory motion across the needles. The double cam $i'$, in revolving, moves the figuring-thread carrier backward on its shaft. At the proper time such carrier is moved forward by the spring $e'$. Thus, by the operations of the said cams and spring the thread-carrier has imparted to it the necessary motions to cause it to lay the thread in a serpentine or zigzag course, in order for the needles to sew such thread down upon the face of the cloth, the embroidery under such circumstances being performed in manner as represented in Fig. 7.

By removing one of the needles from the needle-carrier and using the other needle and its shuttle only for effecting the sewing, the embroidery may be produced in manner as represented in Fig. 8.

By means of the vertical arm or standard supporting the rest-plate, upon which the work is placed for being embroidered, a stocking or other like tubular article may be applied to the machine, the arm or standard being extended within the said stocking. The arm therefore enables the machine to be used for embrodering or figuring tubular as well as other kinds of work.

What I claim as my invention is as follows:

1. In a machine for embroidering hosiery and tubular goods with a straight-laid clocking-stitch, the combination of the long vertical standard or work-carrying arm, constructed as described, and the two shuttles arranged therein and having mechanism for reciprocating them, as described, with two needles, mechanism for imparting to said needles reciprocating vertical movement, and mechanism for laying the figuring-thread back of them, as explained.

2. The combination of the figuring-arm and mechanism for operating it, substantially as described, with two needles and mechanism for reciprocating them vertically and laterally, as explained, and with two shuttles having mechanism for reciprocating them relatively to the needles, and a long hollow vertical standard for holding the work, the whole operating to lay the figuring-thread back of the needles, so as to produce a straight-laid clocking-stitch for hosiery, all as set forth.

ABRAHAM BROOKS.

Witnesses:
R. H. EDDY,
W. W. LUNT.